(12) United States Patent
Pietraski et al.

(10) Patent No.: US 8,249,133 B2
(45) Date of Patent: *Aug. 21, 2012

(54) MITIGATION OF INTERFERENCE IN CELL SEARCH BY WIRELESS TRANSMIT AND RECEIVE UNITS

(75) Inventors: Philip J. Pietraski, Huntington Station, NY (US); Alpaslan Demir, East Meadow, NY (US); Donald M. Grieco, Manhasset, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 366 days.

This patent is subject to a terminal disclaimer.

(21) Appl. No.: 12/571,880

(22) Filed: Oct. 1, 2009

(65) Prior Publication Data

US 2010/0020751 A1 Jan. 28, 2010

Related U.S. Application Data

(63) Continuation of application No. 12/190,935, filed on Aug. 13, 2008, now Pat. No. 7,609,785, which is a continuation of application No. 10/660,842, filed on Sep. 12, 2003, now Pat. No. 7,415,084.

(60) Provisional application No. 60/410,735, filed on Sep. 12, 2002.

(51) Int. Cl.
*H04B 1/00* (2006.01)
(52) U.S. Cl. .................................... 375/150
(58) Field of Classification Search .......... 375/150, 375/130, 335, 346, 145, 146, 149; 370/342, 370/335, 320
See application file for complete search history.

(56) References Cited

U.S. PATENT DOCUMENTS

| | | | |
|---|---|---|---|
| 5,559,790 A | 9/1996 | Yano et al. | |
| 6,185,244 B1 | 2/2001 | Nystrom et al. | |
| 6,363,106 B1 | 3/2002 | Popovic et al. | |
| 6,366,599 B1 * | 4/2002 | Carlson et al. | 375/130 |
| 6,385,259 B1 | 5/2002 | Sung et al. | |
| 6,480,558 B1 | 11/2002 | Ottosson et al. | |
| 6,717,930 B1 | 4/2004 | Sezgin et al. | |
| 6,804,315 B2 | 10/2004 | Demir et al. | |
| 7,062,002 B1 | 6/2006 | Michel et al. | |

(Continued)

FOREIGN PATENT DOCUMENTS

| | | |
|---|---|---|
| EP | 1 215 829 | 6/2002 |
| WO | 01/28120 | 4/2001 |
| WO | 02/069551 | 9/2002 |

OTHER PUBLICATIONS

"Secondary Synchronisation Codes (SSC) Corresponding to the Generalised Hierarchical Golay (GHG) PSC", Texas Instruments, TSGR R1#5(99)574, Cheju Korea, Jun. 1-4, 1999.

(Continued)

*Primary Examiner* — Khai Tran
(74) *Attorney, Agent, or Firm* — Volpe and Koenig, P.C.

(57) ABSTRACT

A wireless transmit receive unit (WTRU) provides facilitation of cell search. In one embodiment, received samples are split into a plurality of sample sets for processing. Each of the sets is processed and an accumulated result is divided by an estimated noise value. In another embodiment, a code correlator correlates the received signal with a primary synchronization code and an auxiliary code correlator having a same length as the code correlator correlates the received signal with a code having a low cross correlation with the primary synchronization code. In another embodiment, a division of an accumulated result with a noise estimate is performed using indexes of the most significant bits.

20 Claims, 4 Drawing Sheets

U.S. PATENT DOCUMENTS

| | | |
|---|---|---|
| 7,450,491 B2 | 11/2008 | Yang |
| 7,609,785 B2 * | 10/2009 | Pietraski et al. ............. 375/335 |
| 2001/0040884 A1 | 11/2001 | Bouquier et al. |
| 2002/0034944 A1 | 3/2002 | Tanno et al. |
| 2002/0057664 A1 | 5/2002 | Sarkar |
| 2003/0108135 A1 | 6/2003 | Frigon |
| 2003/0202564 A1 | 10/2003 | Ho et al. |
| 2003/0231705 A1 | 12/2003 | Lewis |
| 2005/0271177 A1 | 12/2005 | Demir et al. |

OTHER PUBLICATIONS

"Prioritisation for R3 Regarding Release 99", 3GPP TSGR #5(99)574, Kyongiu, South Korea, Oct. 6-8, 1999.

Texas Instruments, "Generalized Hierarchical Golay Sequence for PSC with Low Complexity Correlation Using Pruned Efficient Golay Correlators", 3G TS 25.101, v. 3.1.0, May 25, 1999, pp. 1-4, see all pages.

* cited by examiner

MITIGATION OF INTERFERENCE IN CELL SEARCH BY WIRELESS TRANSMIT AND RECEIVE UNITS

CROSS REFERENCE TO RELATED APPLICATION(S)

This application is a continuation of U.S. patent application Ser. No. 12/190,935, filed Aug. 13, 2008, which is a continuation of U.S. patent application Ser. No. 10/660,842, filed Sep. 12, 2003, now U.S. Pat. No. 7,415,084, which claims priority from U.S. Provisional Application No. 60/410,735 filed Sep. 12, 2002, which are all incorporated by reference as if fully set forth.

FIELD OF INVENTION

The present invention generally relates to the synchronization of a wireless transmit and receive unit (WTRU) to a base station. More particularly, the present invention relates to a cell search system that utilizes improved initial cell search capabilities for the purpose of accepting valid synchronization code detections.

BACKGROUND

Initial cell search algorithms are used to synchronize a WTRU to a base station. The WTRU accomplishes the synchronization procedure via a common channel called the physical synchronization channel (PSCH). In a typical example, the PSCH has a structure wherein the same primary synchronization code (PSC) is transmitted at the beginning of each slot of a frame (which, for example, may have a length of 15 slots), while a different secondary synchronization code (SSC) is transmitted for each slot, resulting in 15 different SSCs. A frame that is 15 slots long can transmit 15 SSCs.

The transmit order of the SSC depends on the primary scrambling code group number. As an example, in a 512 cell system, there are 64 groups. In each group, the patterns of the SSC and its cyclic shifts are different. As a result, there are 512 primary scrambling codes. Each cell of a 512 cell system is assigned a code such that no one code is used by more than one cell in a given reception area.

Therefore, cell search synchronization determines the primary scrambling code of a cell utilizing an initial cell search algorithm. Common initial cell searches implement three (3) major steps:

Step 1 algorithm: detect the PSC and determine a chip offset;

Step 2 algorithm: utilize the information given by the step 1 algorithm and detect the slot offset and code group number; and Step 3 algorithm: utilize the information provided by the step 2 algorithm and detect the primary scrambling code.

Unfortunately, each of the algorithms in each of the above steps has an inherent error associated with it. The error present in each of the steps is caused by the detection of noise by the WTRU associated with the received common downlink channel, which can result in a high number of false detections.

Because timing is unknown, the initial search must be carried out over the total time uncertainty of one frame. In the aforementioned examples, there are fifteen uplink and downlink timeslots during a frame. Since other WTRUs may be transmitting in the uplink timeslots, it is possible that a nearby WTRU transmission will have a higher detected energy than a distant cell. A low complexity method to reject this stronger, false detection and accept only valid PSC detections is required.

An additional problem with initial cell search algorithms is that they cannot handle a rejection by the upper layers of the wrong public land mobile network (PLMN). Since most algorithms detect the strongest cell in the common downlink channel, it is likely that each time the algorithm locates a cell, the same PLMN will be associated with the cell. This results in a deadlock and ultimately an indication to the WTRU that there is no service.

Accordingly, there exists a need for a system and method that reduces the number of false detections by the initial cell search algorithm and is able to overcome the deadlock associated with a rejection due to the wrong PLMN.

SUMMARY

The invention provides embodiments to facilitate cell search. In one embodiment, received samples are split into a plurality of sample sets for processing. Each of the sets is processed and an accumulated result is divided by an estimated noise value. In another embodiment, a code correlator correlates the received signal with a primary synchronization code and an auxiliary code correlator having a same length as the code correlator correlates the received signal with a code having a low cross correlation with the primary synchronization code. In another embodiment, a division of an accumulated result with a noise estimate is performed using indexes of the most significant bits.

DETAILED DESCRIPTION OF THE PREFERRED EMBODIMENT(S)

The present invention will be described with reference to the drawing figures wherein like numerals represent like elements throughout.

Figures 1, 2:
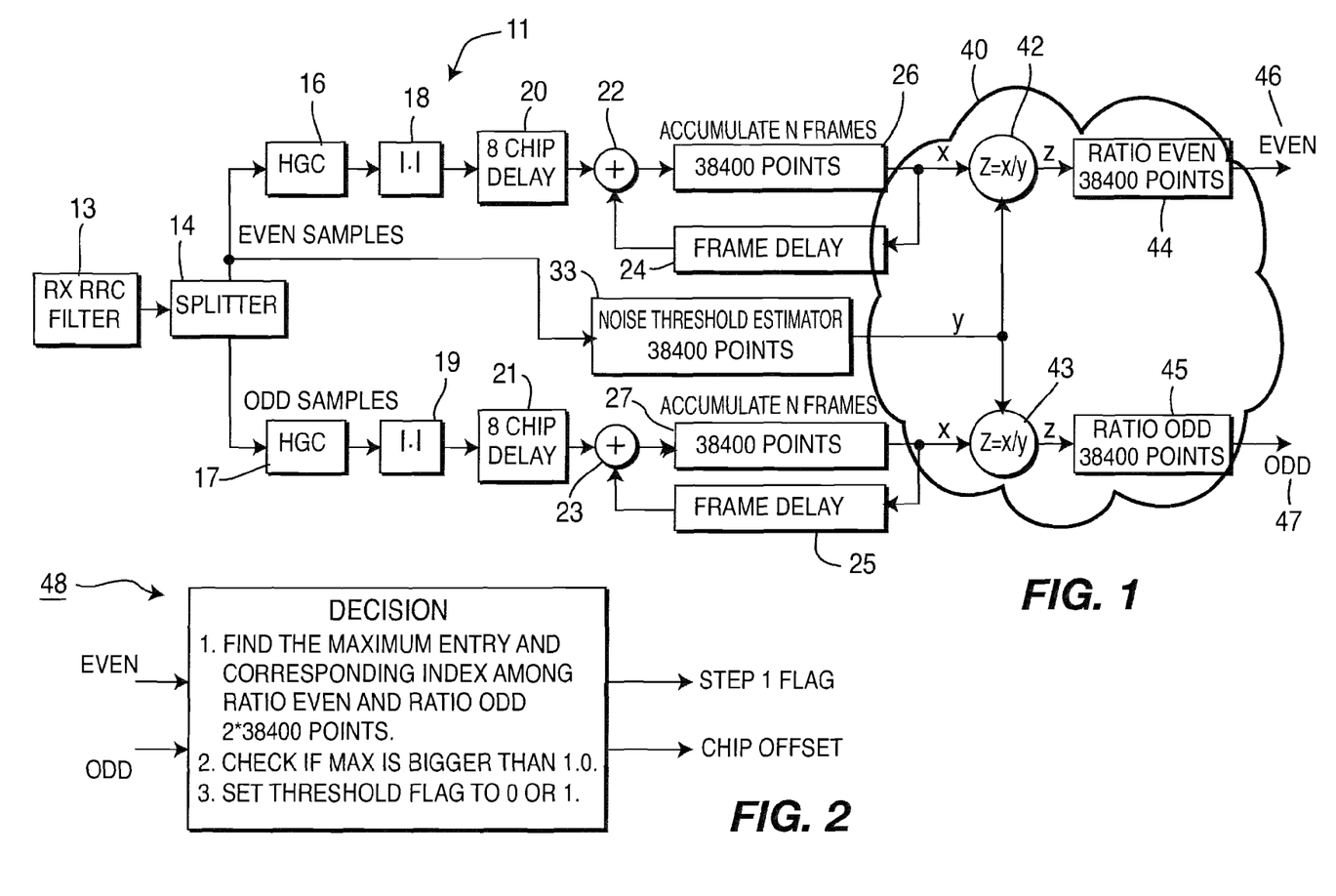
FIG. 1 is a block diagram illustrating the initial cell search system made in accordance with an exemplary embodiment of the present invention.
FIG. 2 is a diagram showing a decision module made in accordance with the present invention.

FIG. 1 is a block diagram of a primary synchronization code (PSC) module 11 for initial cell search embodying the principles of the present invention. The module 11 includes a receive Root Raised Cosine (RxRRC) filter 13, and a splitter 14 to separate samples into groups according to the over-sampling factor used. In this case with the over-sampling factor equal to two (2) samples are split into even and odd samples. Although if a higher sampling rate is used, the splitter may divide the samples into more than two sets, or in general N sets. Also shown are a pair of hierarchal Golay correlators (HGCs) 16, 17, a pair of absolute value modifiers (AVMs) 18, 19, chip delay circuits 20, 21, two adders 22, 23, two frame delay circuits 24, 25, two accumulator registers 26, 27, and a divider output stage 40. The divider output stage 40 includes two divider circuits 42, 43 and two registers 44, 45.

The RxRRC filter 13 samples the received communication signal and forwards the sampled signal to the splitter 14, which splits the filtered samples into even and odd samples, provided as separate signals. Thereafter even and odd samples are separately processed. The even and odd samples are respectively applied to the HGCs 16, 17, the AVMs 18, 19 and the chip delay circuits 20, 21, (which in the present example are shown as effecting 8-chip delays). The HGCs 16, 17 correlate the PSC of the input signal and respectively output the complex values of the even and odd samples of the input signal. The AVMs 18, 19 determine the magnitudes (i.e. absolute values) of the outputs from the HGCs 16, 17. In one example, the magnitude can be determined by following equation:

$$abs(x) \sim \max(|xreal|, |ximag|) + 0.5 * \min(|xreal|, |ximag|) \quad \text{Equation (1)}$$

Equation (1) is only one example. However, other techniques which are detailed hereinafter may be utilized. The purpose of the determination is to reduce the magnitudes to an absolute value (x).

Once the approximated absolute values have been determined by the AVMs 18, 19, the chip delay circuits 20, 21 align the step responses of the HGCs 16, 17 and a noise threshold estimator 33, which receives the even samples from the splitter 14. Either odd or even samples could be used. More generally, with an over-sampling factor of N, any of the N sample streams could be used for such an input.

The outputs from the chip delay circuits 20, 21 are provided to adders 22, 23, which receive delayed signals from frame delay circuits 24, 25 and sum corresponding chips of successive frames. The outputs from the adders 22, 23 are provided respectively to accumulator registers 26, 27, which provide outputs to the frame delay circuits 24, 25 as even and odd accumulator values. In addition, the noise threshold estimator 33 provides a noise threshold output that matches the size of the accumulator registers 26, 27.

The divider circuits 42, 43 of the divider output stage 40 receive the threshold value Y from the noise threshold circuit 33 and the outputs X of the accumulator registers 26, 27 and provide the results of the division operations Z=X/Y to registers 44, 45, respectively. The registers 44, 45 provide even and odd value outputs 46, 47. If the outputs X from the accumulator registers 26, 27 are less than the threshold value Y, then the respective outputs Z of the divider circuits 42, 43 is assumed to be zero, and a zero output value is provided to the registers 44, 45, otherwise division or other appropriate operation is performed.

Referring to FIG. 2, a block diagram of a decision module 48 that operates on the even and odd value outputs 46, 47 of FIG. 1 is shown. The decision module 48 finds the maximum entry and corresponding index among even and odd value outputs 46, 47 points. In the exemplary embodiment, this is performed over 38,400 points for each of the even and odd value outputs 46, 47. A comparison is made to determine if the maximum entry is larger than one. If so, a threshold flag is set to one. If the maximum entry is smaller than one, the threshold flag is set to zero. The chip offset is derived from the index associated with the maximum entry.

Figure 3:
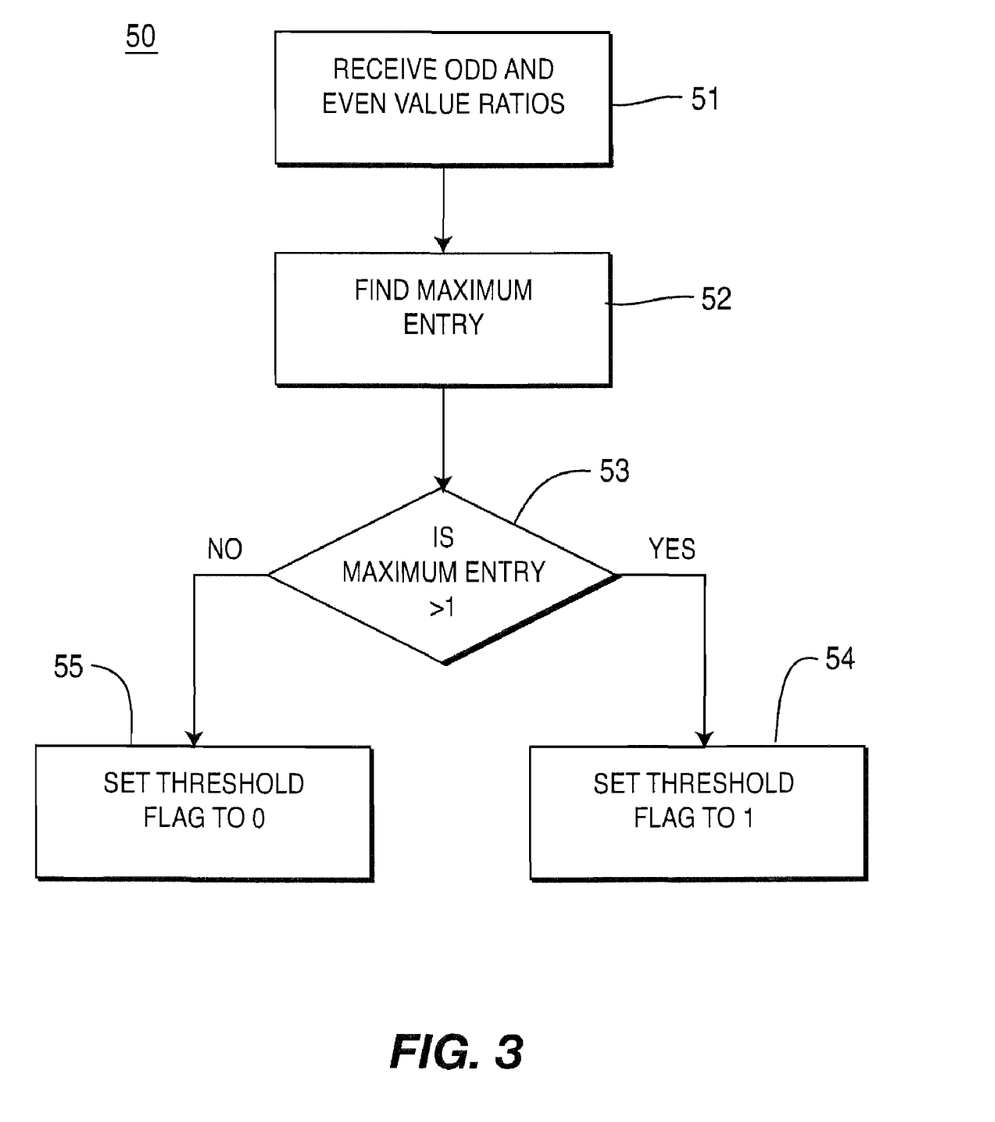
FIG. 3 is a flow diagram of the operation of the decision method of FIG. 2.

Referring to FIG. 3, a flow diagram of the process 50 implemented by the decision module 48 of FIG. 2 is shown. The process 50 is implemented in three steps. Even and odd value outputs 46, 47 are received (step 51) and a maximum entry and corresponding index among even and odd value outputs 46, 47 is determined (step 52). A determination is then made (step 53) if the maximum entry from step 52 exceeds 1. If so, the threshold flag is set to 1 (step 54); whereas if not, the threshold flag is set to 0 (step 55).

According to the present invention, a PSC processing algorithm is based on a division method (e.g., signal-to-noise ratio (SNR) estimate) and a new noise estimator. In general, an N-times oversampled detector processes N times the samples as the chip rate sampled detector. The noise estimation block outputs will only be used if qualified. In order to qualify the outputs, the signal power estimate must be greater than the noise power estimate scaled by some constant, (i.e., the noise threshold coefficient). Increasing or decreasing the noise threshold coefficient will vary the number of divisions required.

The division function performed by divider circuits 42, 43 can be simplified due to its low required dynamic range. The ratio A/B can be replaced by a monotonic function of the ratio f(A/B), since only the maximum of the ratio must be found. There are several possible ways to exploit this. A first alternative method uses only shifts, adds, and a small lookup table (LUT) to implement such a function. A compare is also used to qualify the observation. It should be understood that this is only one preferred method. Other methods may be utilized.

Let A and B each be n-bit numbers. An approximation to F(A/B) can be found by using log(x) as the monotone function. Also the calculation is only to be made when A is suitably larger than B. This is provided as a multi-step process:

Step 1) If A<kB, Stop (equivalent to clipping the low values; no need to perform the division because this observation has almost no chance of being the largest.)

Step 2a) Let a be the n-bit number taken from A starting at index I, the first non-zero entry in A starting at the MSB.

Step 2b) Let b be the n-bit number taken from B starting at index J, the first non-zero entry in B starting at the MSB.

Step 3) Use an n−1 bit LUT to find log(a) and log(b). Only n−1 bits are needed since the MSB bit is always '1'.

Step 4) The result is:

$$F(A, B) = \log(a) - \log(b) + I - J \approx \log\left(\frac{A}{B}\right) \quad \text{Equation (2)}$$

Figure 4:
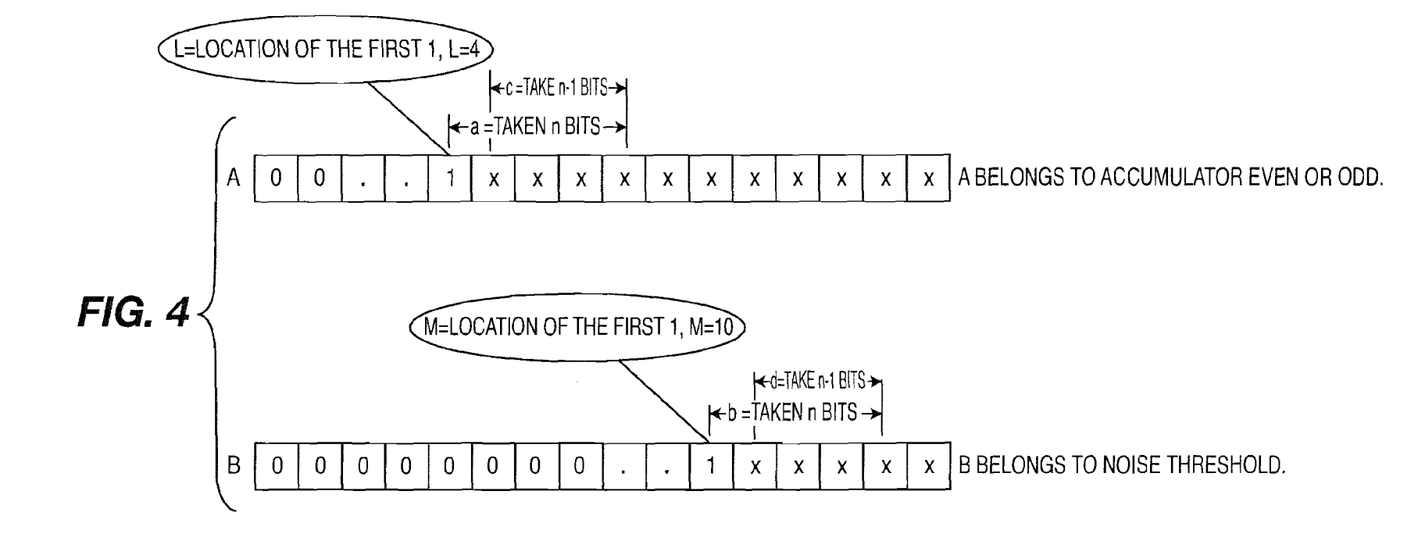
FIG. 4 is a block diagram of an example of efficient division in PSC processing algorithm of the present invention.
Figure 5:
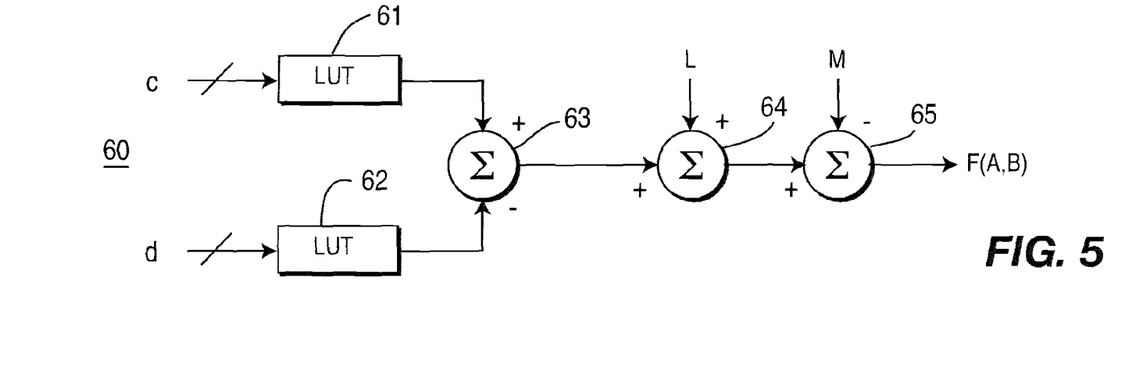
FIG. 5 is a block diagram of a circuit used to process the data depicted in FIG. 4.

One exemplary technique for implementing the inventive process is depicted in FIGS. 4 and 5. FIG. 4 shows two bit sequences in binary format A, B. The first bit sequence A corresponds to the output of one of the odd or even accumulators, (for example the even and odd value outputs 46, 47 in FIG. 1). The second bit sequence B corresponds to the noise threshold. The parameters c and d are then determined from A, and B as shown in the figure by taking n−1 bits. These parameters, c and d, are inputs to the circuit 60 of FIG. 5.

Referring to FIG. 5, the circuit 60 includes two lookup tables (LUTs) 61, 62, a first summing circuit 63, a second summing circuit 64 and a third summing circuit 65. The LUTs 61, 62 use c and d inputs and provide values in accordance with the following:

$$c = n-1 \text{ indicated } LSB \text{ bits of } A \quad \text{Equation (3)}$$

$$d = n-1 \text{ indicated } LSB \text{ bits of } B \quad \text{Equation (4)}$$

$$LUT = \log(x), x \in \{1, 2, 3, \ldots 2^{n-1}-1\} \quad \text{Equation (5)}$$

The LUTs 61, 62 provide outputs which are summed in summing circuit 63. The output of the first summer 63 is provided to the second summer 64 which sums the value with a bit value corresponding to L, the location of the first 1 of bit sequence A, e.g., L=4. The output of the second summer 64 is provided to the third summer 65 which sums the value from the second summer 64 with a bit value corresponding to M, the location of the first 1 of the bit sequence B, e.g., M=10. This provides an output F(A,B), which can be used in place of A/B.

As shown in FIGS. 4 and 5, each division will require only two (2) shifts, two (2) LUT usages of the same LUT, and three (3) additions. In this way, the overall complexity compared to doing a full division on each point is dramatically reduced. The majority of observations will not lead to any divisions since the threshold will be set well above the mean value of the observations.

Because SNR estimates are made throughout the frame, both the HGCs 16, 17 and the noise threshold estimator 33 are subject to non-stationary noise, (e.g., the slot where the nearby WTRU is transmitting will be very noisy). Since SNR measurements are made throughout the frame, it is important that the HGCs 16, 17 and the noise threshold estimator 33 have a similar 'step response' to the changes in noise level. The method used is to correlate the signal with a code that has low correlation to the PSC and the secondary synchronization codes (SSC)s. This can also be implemented with a hierarchical Golay correlator referred to here as the auxiliary HGC. It is advantageous to include some additional filtering of the SNR estimate, e.g., a short FIR filter and the AHGC code should be shifted to compensate for the delay introduced by this filter. Since precise step response matching is impossible with the additional filter, the filter impulse response length should be kept short compared to the AHGC length. In this way, a low complexity, low variance noise estimate may be obtained with a similar step response to the HGC, thus providing good SNR estimates in the presence of non-stationary noise.

Figure 6:
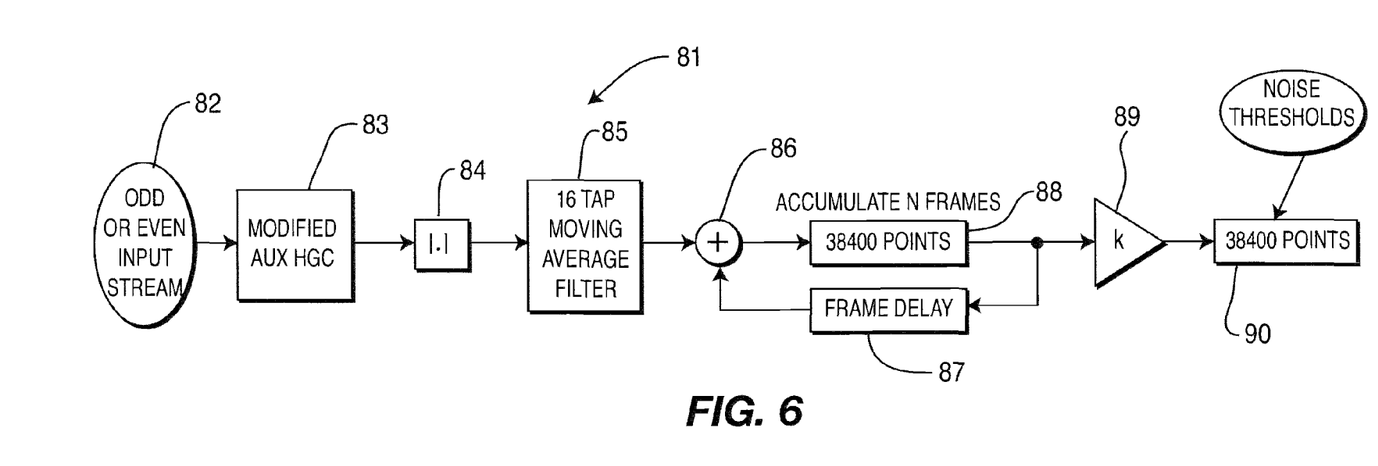
FIG. 6 is the noise threshold estimator.

FIG. 6 is a block diagram of the noise threshold estimator 33. The noise threshold estimator 33 is implemented with a 16-tap moving average (MA) filter. An even or odd input stream 82 is received and provided to a modified auxiliary HGC (AHGC) 83. An output from the AHGC 83 is provided to an AVM 84, which in turn provides its output to a 16 tap MA filter 85. The output of the MA filter 85 is provided to a summer 86 that receives a signal from a frame delay circuit 87, and provides a summed output to an accumulating register 88. The output from register 88 is provided to the frame delay circuit 87 and to an amplifier 89, which provides an output as a noise threshold at a register 90.

Figure 7:
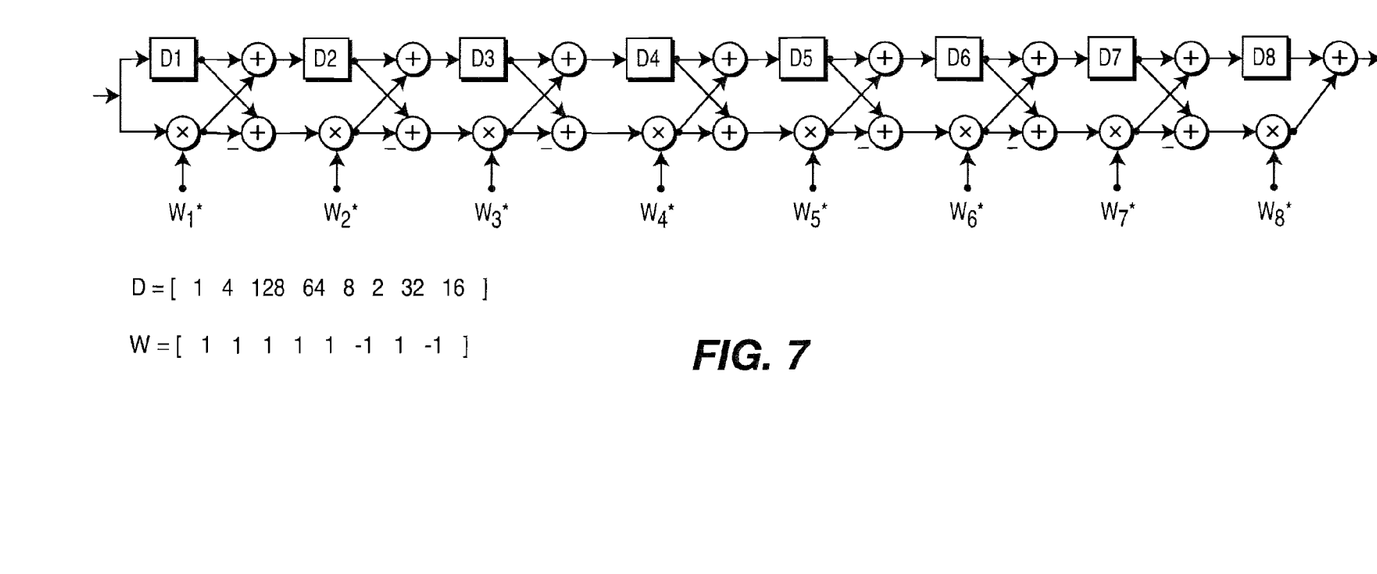
FIG. 7 is a diagram of an example of an auxiliary hierarchal Golay correlator (AHGC) internal structure for use in the noise estimation process in the noise threshold estimator.

FIG. 7 shows an example of a possible AHGC internal structure for use in the noise threshold estimator 33. The structure is an efficient Golay correlator selected to have low correlation to PSC and SSC codes. It should be noted that although specific values D and W are shown, many suitable parameters for D and W can be found.

The inventive use of an HGC for noise estimation, a qualification stage to reduce the number of samples to process, an SNR-based division method to generate statistics, and a simplified division process create a reliable and low complexity procedure for mitigating the problem of WTRU interference during cell search.

Although the preferred embodiments are described in conjunction with a third generation partnership program (3GPP) wideband code division multiple access (W-CDMA) system utilizing the time division duplex (TDD) mode, the embodiments are applicable to any hybrid code division multiple access (CDMA)/time division multiple access (TDMA) communication system. Additionally, some embodiments are applicable to CDMA systems, in general, using beam forming, such as the proposed frequency division duplex (FDD) mode of 3GPP W-CDMA.

What is claimed is:

1. A method for a wireless transmit/receive unit (WTRU) to facilitate initial cell search in wireless communications comprising:
   sampling a received signal to produce received signal samples;
   generating correlation values by correlating the samples with a synchronization code;
   generating noise estimates from the samples;
   generating approximations of ratio values of correlation values and noise estimates; and
   detecting a chip offset based on the generated approximations of ratio values.

2. The method of claim 1 performed with respect to code division multiple access (CDMA) communications wherein the correlating the samples is performed using a synchronization code having low correlation with a primary synchronization code (PSC) and a secondary synchronization code (SSC) associated with the received signal.

3. The method of claim 1 wherein the noise estimates are generated based on a plurality of samples and the approximations of ratio values are generated with respect to a selected number of correlation values and noise estimates corresponding to the selected number of correlation values.

4. The method of claim 1 wherein the approximations of ratio values are generated using a look-up table.

5. The method of claim 1 wherein the chip offset is detected based on a maximum value of approximations of ratio values generated with respect to a selected number of samples.

6. The method of claim 1 wherein:
   the received signal is sampled at multiple of a chip rate associated with the received signal;
   correlation values are generated with respect to sets of selected samples that are selected based on the multiple of the chip rate;
   noise estimates are generated with respect to one of the sets of selected samples; and
   approximations of ratio values are generated with respect to correlation values for each set of selected samples and the noise estimates.

7. The method of claim 6 wherein the approximations of ratio values are generated using a look-up table.

8. The method of claim 6 wherein the chip offset is detected based on a maximum value of approximations of ratio values generated with respect to a selected number of samples.

9. The method of claim 6 wherein correlation values are generated using a hierarchal golay correlator for each set of selected samples.

10. The method of claim 1 wherein correlation values are generated using a hierarchal golay correlator.

11. A wireless transmit/receive unit (WTRU) comprising:
   sampling device configured to sample a received signal to produce received signal samples;
   correlation circuitry configured to generate correlation values by correlating the samples with a synchronization code;
   noise estimation circuitry configured to generate noise estimates from the samples;
   computational circuitry configured to generate approximations of ratio values of correlation values and noise estimates; and a decision module configured to detect a chip offset based on the approximations of ratio values generated by the computational circuitry to facilitate initial cell search in wireless communications.

12. The WTRU of claim 11 configured to conduct code division multiple access (CDMA) communications wherein the correlation circuitry is configured to correlate the samples using a synchronization code having low correlation with a primary synchronization code (PSC) and a secondary synchronization code (SSC) associated with the received signal.

13. The WTRU of claim 11 wherein the noise estimation circuitry is configured to generate noise estimates based on a plurality of samples and the computational circuitry is configured to generate approximations of ratio values with respect to a selected number of correlation values and noise estimates corresponding to the selected number of correlation values.

14. The WTRU of claim 11 wherein the computational circuitry is configured to generate approximations of ratio values using a look-up table.

15. The WTRU of claim 11 wherein the decision module is configured to detect a chip offset based on a maximum value of approximations of ratio values generated with respect to a selected number of samples.

16. The WTRU of claim 11 wherein:
the sampling device configured to sample the received signal at multiple of a chip rate associated with the received signal;
the correlation circuitry is configured to generate correlation values with respect to sets of selected samples that are selected based on the multiple of the chip rate;
the noise estimation circuitry is configured to generate noise estimates with respect to one of the sets of selected samples; and
the computational circuitry is configured to generate approximations of ratio values with respect to correlation values for each set of selected samples and the noise estimates.

17. The WTRU of claim 16 wherein the computational circuitry is configured to generate approximations of ratio values using a look-up table.

18. The WTRU of claim 16 wherein the decision module is configured to detect a chip offset based on a maximum value of approximations of ratio values generated with respect to a selected number of samples.

19. The WTRU of claim 16 wherein the correlation circuitry is configured to split the samples into a number of sets equal to the multiple of the chip rate and includes a plurality of hierarchal golay correlators, each configured to generate correlation values for one of the sets of samples.

20. The WTRU of claim 11 wherein the correlation circuitry is configured to generate correlation values using a hierarchal golay correlator.

* * * * *

UNITED STATES PATENT AND TRADEMARK OFFICE
CERTIFICATE OF CORRECTION

PATENT NO. : 8,249,133 B2  Page 1 of 1
APPLICATION NO. : 12/571880
DATED : August 21, 2012
INVENTOR(S) : Pietraski et al.

It is certified that error appears in the above-identified patent and that said Letters Patent is hereby corrected as shown below:

At Claim 9, column 6, line 53, after "generated using a", delete "hierarchal" and insert --hierarchical--.

At Claim 10, column 6, line 56, after "generated using a", delete "hierarchal" and insert --hierarchical--.

At Claim 19, column 8, line 21, after "of", delete "hierarchal" and insert --hierarchical--.

At Claim 19, column 8, line 25, before "golay correlator.", delete "hierarchal" and insert --hierarchical--.

Signed and Sealed this
Second Day of April, 2013

Teresa Stanek Rea
*Acting Director of the United States Patent and Trademark Office*